United States Patent
Stork et al.

(10) Patent No.: US 9,910,871 B2
(45) Date of Patent: Mar. 6, 2018

(54) TRANSPARENT DATABASE TABLE REPLACEMENT

(71) Applicants: Christian Stork, Hamm (DE); Kerstin Hoeft, Wiesloch (DE); Frank Becker, Borken (DE); Bernd Roedel, Duesseldorf (DE); Thomas Beissel, Muelheim an der Ruhr (DE)

(72) Inventors: Christian Stork, Hamm (DE); Kerstin Hoeft, Wiesloch (DE); Frank Becker, Borken (DE); Bernd Roedel, Duesseldorf (DE); Thomas Beissel, Muelheim an der Ruhr (DE)

(73) Assignee: SAP SE, Walldorf (DE)

( * ) Notice: Subject to any disclaimer, the term of this patent is extended or adjusted under 35 U.S.C. 154(b) by 449 days.

(21) Appl. No.: 14/570,672

(22) Filed: Dec. 15, 2014

(65) Prior Publication Data

US 2016/0171020 A1    Jun. 16, 2016

(51) Int. Cl.
*G06F 17/30* (2006.01)

(52) U.S. Cl.
CPC .. *G06F 17/30294* (2013.01); *G06F 17/30194* (2013.01); *G06F 17/30339* (2013.01); *G06F 17/30569* (2013.01); *G06F 17/30595* (2013.01)

(58) Field of Classification Search
CPC ......... G06F 17/30294; G06F 17/30194; G06F 17/30339; G06F 17/30569; G06F 17/30595

See application file for complete search history.

(56) References Cited

U.S. PATENT DOCUMENTS

| | | | | |
|---|---|---|---|---|
| 5,630,116 A * | 5/1997 | Takaya | ............... | G06F 17/30067 |
| 5,974,418 A * | 10/1999 | Blinn | ................ | G06F 17/30569 |
| | | | | 705/26.1 |
| 6,058,391 A * | 5/2000 | Gardner | ............ | G06F 17/30595 |
| 6,678,674 B1 | 1/2004 | Saeki | | |
| 9,483,584 B2 * | 11/2016 | Batra | ....................... | G06F 17/50 |
| 2002/0184228 A1 | 12/2002 | Ghukasyan et al. | | |
| 2010/0332510 A1* | 12/2010 | Gitai | ................. | G06F 17/30292 |
| | | | | 707/759 |
| 2011/0047171 A1 | 2/2011 | Paparizos et al. | | |
| 2014/0258217 A1* | 9/2014 | Kemmler | .......... | G06F 17/30289 |
| | | | | 707/609 |
| 2015/0074069 A1 | 3/2015 | Baeuerle et al. | | |
| 2015/0074083 A1 | 3/2015 | Hutzel et al. | | |
| 2016/0063107 A1* | 3/2016 | Schukovets | ......... | G06F 17/3056 |
| | | | | 707/770 |

OTHER PUBLICATIONS

Extended European Search Report received in counterpart European Patent Application No. 15181709.5, dated May 23, 2016, 7 pages.

(Continued)

*Primary Examiner* — Huawen A Peng
(74) *Attorney, Agent, or Firm* — Klarquist Sparkman, LLP

(57) ABSTRACT

A table can be replaced with a view transparently to the application. For example, a data dictionary can specify that the view is to be substituted for the table. At runtime, application operations on the table are redirected to be performed on the view. Validation can be performed to ensure congruence between the table and the view. Can be useful for situations where a view with enhanced functionality is desired to be used in place of the table without re-coding the application.

20 Claims, 8 Drawing Sheets

(56) References Cited

OTHER PUBLICATIONS

Swanepoel, "New Data Modeling Features in SAP NW ABAP 7.4 SP5," *SAP Community Network*, Feb. 4, 2014, 12 pages.
"Data definition language," *Wikipedia*, visited Nov. 25, 2014, 5 pages.
"Create a View in CDS," SAP Help Portal, visited Nov. 26, 2014, 4 pages.
"Creating the Persistence Model in Core Data Services," SAP Help Portal, visited Nov. 26, 2014, 1 page.
"ABAP," Wikipedia, visited Dec. 10, 2014, 14 pages.

* cited by examiner

TRANSPARENT DATABASE TABLE REPLACEMENT

BACKGROUND

As new database features are made available to developers by database management systems, a need to re-code software or manually replace items in the database sometimes arises. But such approaches are fraught with difficulties.

There is therefore room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In one embodiment, a method of controlling database operations at runtime of an application comprises, at runtime of an application, receiving a request from the application to perform an operation on a database table via a database table identifier; detecting that a replacement database view with a database view identifier has been specified for the database table; and when translating the request to perform the operation, substituting the database view identifier for the database table identifier, thereby replacing the database table with the replacement database view transparently to the application.

In another embodiment, a system controlling database operations performed by an application comprises a data dictionary comprising (a) a description of a database view comprising a database view identifier; and (b) a description of a database table comprising a database table identifier, wherein the description of the database table comprises a reference to the database view and an indication that the database view is to replace the database table; an application execution engine comprising (c) a view object comprising a reference to a database view; and (d) a table object comprising a reference to the view object and an indication that the view object is to be used in place of a table represented by the table object; wherein the application execution engine is configured to, responsive to receiving an operation from the application specifying the database table identifier, detecting that the table object representing the database table specified by the database table identifier indicates that the view object is to be used in place of the database table, and responsive to so detecting, substituting the reference to the database view specified by the view object in place of the database table identifier for the operation.

In another embodiment, one or more computer-readable media comprise computer-executable instructions causing a computing system to perform a method comprising reading a data dictionary comprising a classic database view description describing a classic database view and an enhanced database view description describing an enhanced database view, wherein the data dictionary specifies that the enhanced database view is to replace the classic database view; confirming that the classic database view description and the enhanced database view description indicate congruent description for the classic database view and the enhanced database view, wherein the confirming comprises performing a congruence check; based on the enhanced database view description, creating an enhanced view object stored in memory comprising a reference to the enhanced database view; based on the classic database view description, creating a classic view object stored in memory indicating that the classic database view is replaced by the enhanced database view, wherein the classic view object comprises a reference to the enhanced view object; and at runtime, when receiving a request to perform an operation on the classic database view, detecting that the classic view object indicates that the classic database view is to be replaced by the enhanced database view, verifying that the classic view object indicates that the congruence check was successful, substituting the enhanced database view for the classic database view, and performing the operation on the enhanced database view instead of the classic database view.

As described herein, a variety of other features and advantages can be incorporated into the technologies as desired.

DETAILED DESCRIPTION

Example 1—Example Overview

New functionality may be offered by a database management system in the form of views. Application developers may wish to immediately take advantage of such functionality by replacing tables with views. The technologies herein allow such replacement to be performed transparently to applications. For example, a simple configuration change can avoid re-coding the application or manually replacing the table with a view.

Developers can thus benefit from the technologies. End users also benefit in that applications can incorporate enhanced functionality sooner.

Figure 1:
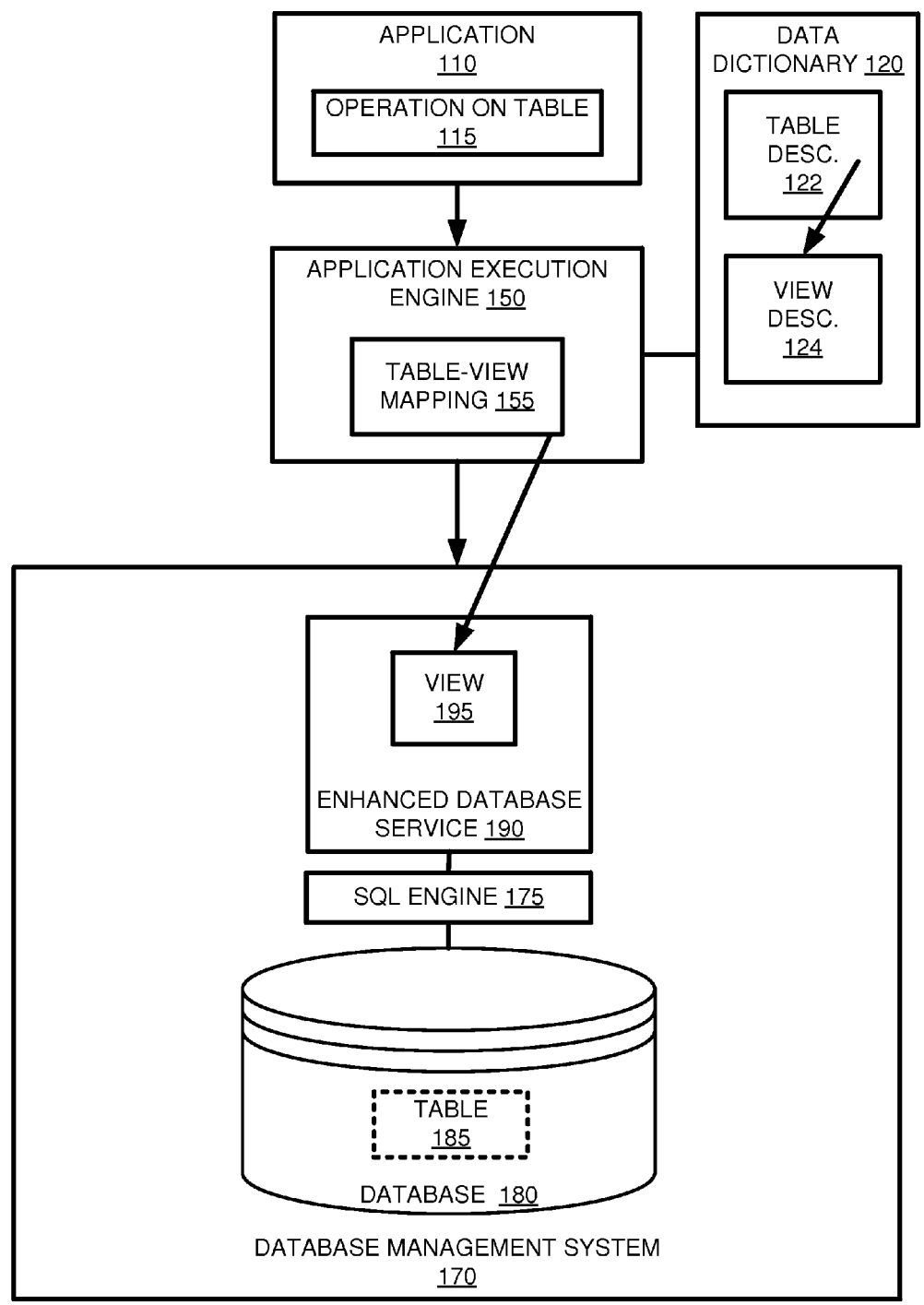
FIG. 1 is a block diagram of an example system for implementing transparent database table replacement.

Example 2—Example System Implementing Transparent Database Table Replacement FIG. 1 is a block diagram of an example system 100 implementing transparent database table replacement as described herein. The system 100 can control database operations performed by an application 110.

In the example, an application 110 includes an operation 115 on a database table 185. The application 110 is executed by an application execution engine 150, which receives a request from the application 110 to perform an action on the table 185.

The execution engine 150 includes a table-view mapping 155 that maps the replaced table to the view that replaces it.

The mapping 155 can be constructed based on the data dictionary 120, which comprises a description 122 of the table 185 with a table identifier and a description 124 of the view 195 with a view identifier. As described herein, the table description 122 can include a reference to the view 195 and an indication that the database view is to replace the database table.

The application engine 150 achieves execution of the application 110 by processing commands, including a database operation 115 on the table 185. Database operations are translated and passed to the database management system 170.

The database management system 170 can receive operations to be performed on the database 180. In practice, an SQL engine 175 can implement the operations on the database 180. In some embodiments, an enhanced database service 190 can provide richer functionality beyond that available via the SQL engine 175. For example, the view 195 can be provided by such enhanced database services 190. Other unenhanced operations can go (e.g., directly or pass through) to the SQL engine 175.

The application execution engine 150 can inhibit activation of the database table 185 until the database table 185 and the database view 195 are congruent as described herein.

In any of the examples herein, although some of the subsystems are shown on a single page, in practice, they can be implemented as computing systems having more than one device. Boundaries between the components can be varied. For example, although the database management system 170 is shown as a single entity, it can be implemented by a plurality of devices.

In practice, the systems shown herein, such as system 100, can vary in complexity, with additional functionality, more complex components, and the like. For example, additional components can be included to implement security, redundancy, load balancing, report design, single sign on, and the like.

In practice, a large number of different applications 110 and application execution engine 150 instances (e.g., executing at plural instances of a client system, in the cloud, or the like) can be supported.

The described computing systems can be networked via wired or wireless network connections. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the inputs, outputs, requests, data dictionaries, mappings, objects, databases, and environments can be stored in one or more computer-readable storage media or computer-readable storage devices. The technologies described herein can be generic to the specifics of operating systems or hardware and can be applied in any variety of environments to take advantage of the described features.

Example 3—Example Method Implementing Transparent Database Table Replacement

Figure 2:
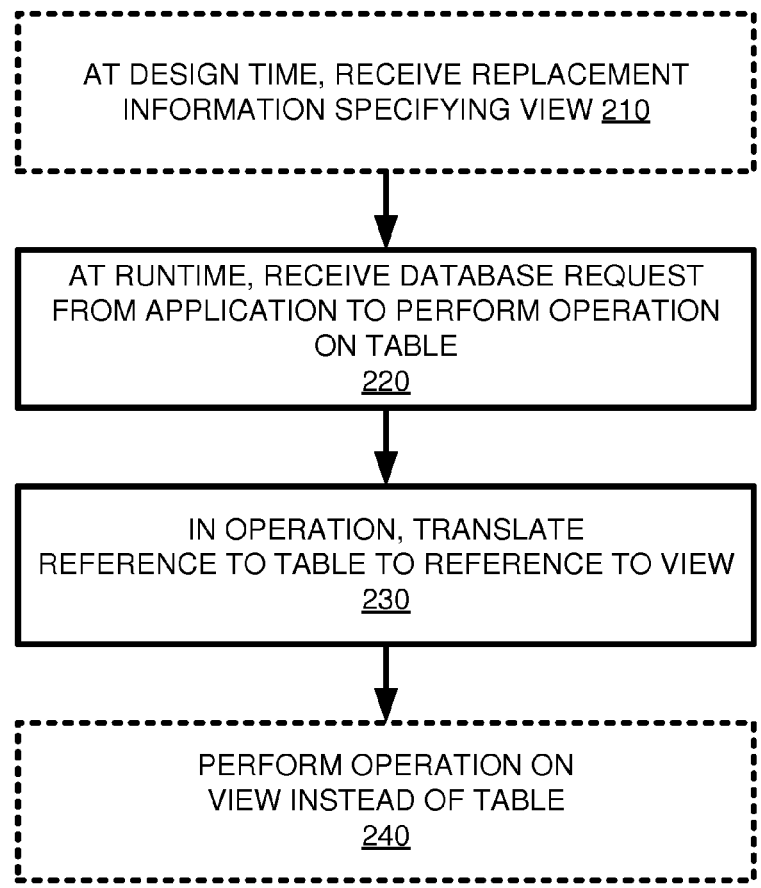
FIG. 2 is a flowchart of an example method of implementing transparent database table replacement.
Figure 2:

FIG. 2 is a flowchart of an example method 200 of transparent database table replacement and can be implemented, for example, in the system shown in FIG. 1. The example includes design time and runtime activities. Various parts of the overall method are described in more detail separately herein and can be performed separately.

At 210, at design time of the application, replacement information specifying the view to replace a table is received. For example, as described herein, an indication of replacement (e.g., a REPLACE statement that the table is to be replaced with the view) can be placed in a data dictionary. As described herein, validation can be performed to verify congruence between the table and the view.

At 220, at runtime of the application, a request from the operation to perform an operation on a table is received. As described herein, it can be detected that a replacement view has been put into place for the table.

At 230, in the operation, the reference to the table is translated (e.g., redirected) to a reference to the view. For example, an identifier of the view can be substituted for an identifier of the table. In other words, the table identifier is replaced by the view identifier.

At 240, the operation is performed on the view instead of the table. Such an act is performed responsive to the request to perform the operation on the table. Thus, the replacement of the table with the view is performed transparently to the program.

Changes made to the table or view can result in re-validation as described herein.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, for 220 "receive request from application" can also be described as "send request to application execution engine."

Example 4—Example Application

In any of the examples herein, an application can be a software application that includes operations performed on a database. Such applications can be of a variety of languages and typically include a facility for performing operations on database tables and views (e.g., via SQL or an SQL-like language).

Example 5—Example Database Operations

In any of the examples herein, an operation on a database can be any of the familiar create, retrieve, update, and delete functions; operations performed via SQL (e.g., SELECT, UPDATE, INSERT or the like); as well as any number of other operations that depend on database functionality.

An implementation can limit table replacement to certain statements (e.g., SELECT). Thus, it can be determined at runtime whether the operation comprises a SELECT statement, and responsive to determining that the operation does comprise a SELECT statement, performing replacement (or substitution, redirection, or the like) for the SELECT statement. In an operation, a reference to a table in other statements (e.g., UPDATE, INSERT, or the like) can be left un-replaced. Such statements can continue to be performed on the (original) table.

In this way, transparent database table replacement can be performed selectively based on the type of statement in the operation. The technology can select between performing replacement and not performing replacement based on the statement type (e.g., whether the statement is a SELECT statement) in an operation.

Example 6—Example Application Execution Engine

In any of the examples herein, an application execution engine can take the form of an engine configured to accept and execute application code. For example, a virtual machine can accept commands as source code, object code, generated byte code (e.g., based on source code), or the like. Engines such as Java virtual machines, application servers, or the like can be supported. The technologies described herein can be implemented in any of a variety of languages, including Java, Advanced Business Application Programming (ABAP), or the like.

As described herein, the application execution engine can access a data dictionary to determine how to interact with a database. The application execution engine can accept database-independent statements (e.g., in OpenSQL or the like) and translate them into statements understood by the underlying database management system (e.g., native SQL or the like).

Example 7—Example Data Dictionary

In any of the examples herein, a data dictionary can include descriptions (e.g., metadata) of database elements such as tables, views, indexes, and the like. The data dictionary can follow a syntax that allows specification of attributes and features of such database elements. In practice, the data dictionary can be examined by an application execution engine when interacting with a database.

The data dictionary can include new dictionary objects that are supported by an enhanced database service as described herein. For example, views with enhanced functionality can be included.

Example 8—Example Database View

In any of the examples herein, the view can be provided by an enhanced database service providing view functionality beyond that of an SQL engine as described herein.

In a simple case, the view can merely mirror the database table it is to replace but be specified as to be provided by the enhanced database service. In this way, classic functionality of the table can be provided, but optimizations or other functionality can be provided by the enhanced database service.

Although examples show a view providing functionality beyond that of a classic SQL engine that replaces a table, the replaced table can instead be a classic view without enhanced functionality and still benefit from the technologies described herein. Thus, a second view (e.g., enhanced) can transparently replace a first (e.g., classic) view if desired. Therefore, in any of the examples herein, a first (e.g., classic) view can be implemented instead of a table (e.g., and classic view objects used in place of table objects, and so forth), and the described view becomes a second view that replaces the first.

Example 9—Example Table and View Identifiers

In any of the examples herein, a table identifier can take the form of a table name or other indication that identifies the table. In practice, software may use a token or other indicia to uniquely identify a table. Views can be similarly identified.

Example 10—Example Configuration Method

Figure 3:
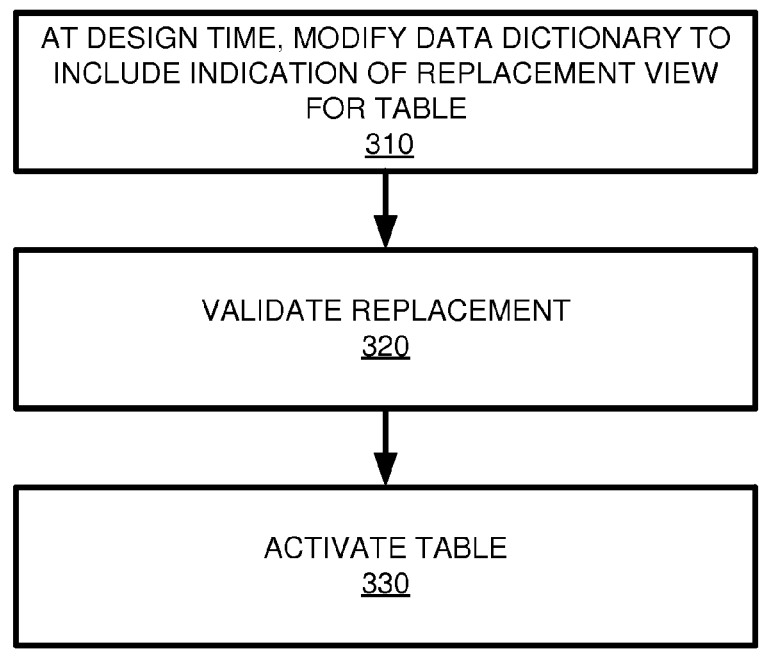
FIG. 3 is a flowchart of an example method implementing configuration before performing transparent database replacement.

FIG. 3 is a flowchart of an example method 300 of implementing configuration for transparent database table replacement and can be implemented, for example, in the system shown in FIG. 1. For example, the method can be performed as part of 210 of the method of FIG. 2 and completed before runtime.

At 310, at design time of the application, a data dictionary is modified to include an indication of the replacement view for the database table. For example, a replace statement or parameter can be specified in the description of the table to refer to the view (e.g., a view identifier, view object, or the like).

At 320, the replacement is validated. For example, upon detecting that the data dictionary specifies a replacement for the table, congruence between the table and the view replacing it can be validated. For example, if the table and the view have the same fields in the same sequence, with the same data types (e.g., and lengths, precision, etc.), congruence is indicated. Otherwise incongruence (e.g., no congruence, inconsistency, or the like) is indicated, and validation fails. Other items in the description (e.g., keys) can be different.

Figure 7:
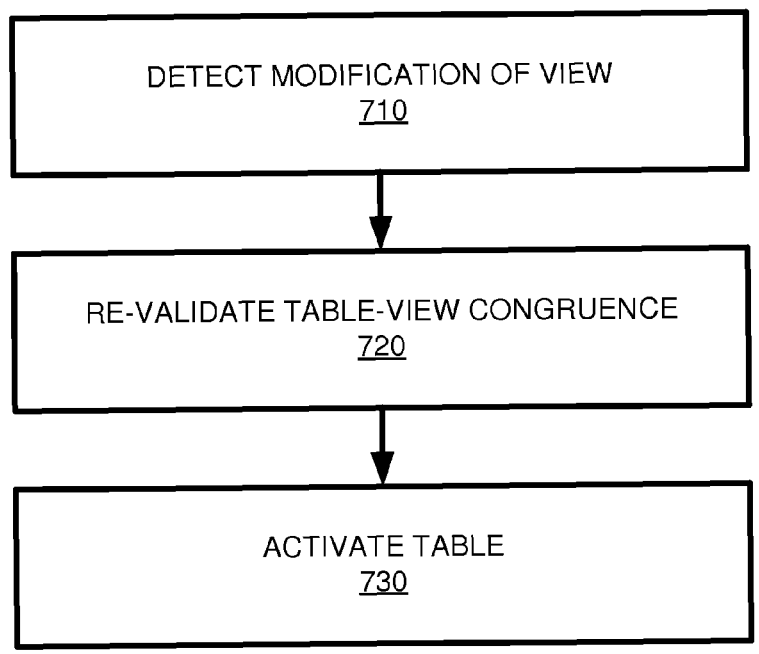
FIG. 7 is a flowchart of an example method implementing table-view congruence validation after a view has been modified.

Further details and alternatives concerning validation are described in the description of FIG. 7.

At 330, responsive to successful validation (e.g., congruence between the table and view), the table is activated.

Execution of the application can then proceed, and the table is replaced with the view transparently as described herein.

Changes made to the description of the table or view in the data dictionary can result in revalidation.

Figure 4:
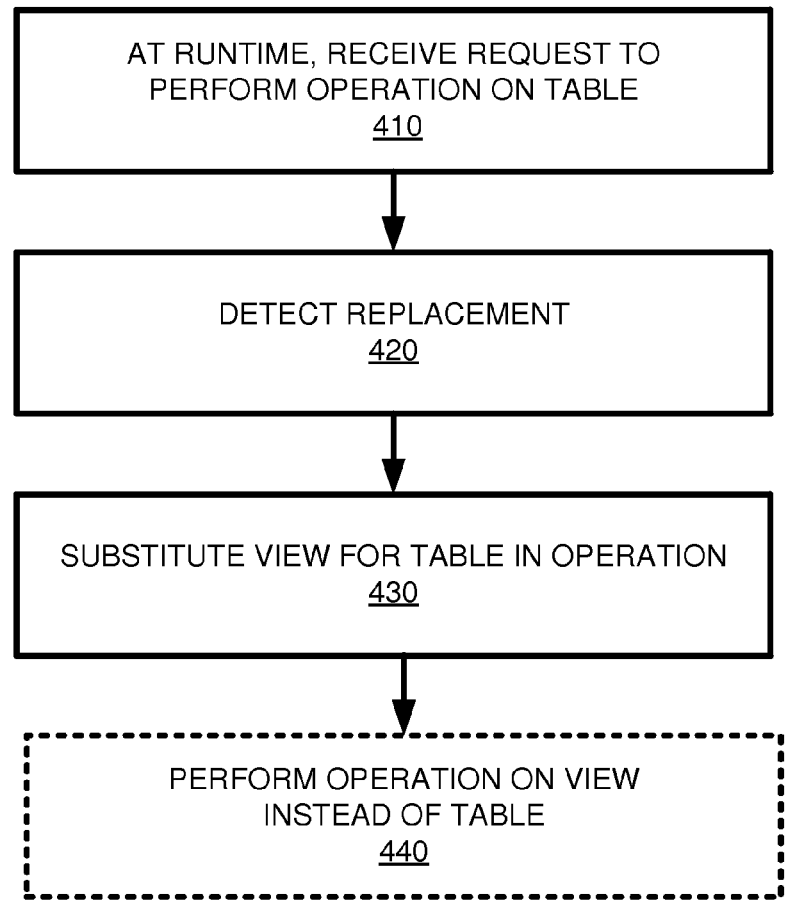
FIG. 4 is a flowchart of an example method of implementing transparent database table replacement at runtime.

Example 11—Example Method of Implementing Transparent Database Table Replacement at Runtime FIG. 4 is a flowchart of an example method 400 of implementing transparent database table replacement at runtime and can be implemented, for example, in the system shown in FIG. 1. For example, the method 400 can be used to achieve 230-240 of FIG. 2. The method 400 can control (e.g., redirect) database operations at runtime of an application.

Various configuration can be performed in advance of the method 400 as described herein. For example, the table and view can be activated, a table object and a view object can be created and stored in memory, and the like.

At 410, at runtime, a request to perform an operation on a table is received from an application by an application execution engine. The request can specify the operation via a database table identifier. Such a request can take the form of encountering an instruction in the application that specifies the database table identifier. In practice, interpreted, compiled, and just-in-time compiled implementations can be supported. Operations on databases can include the familiar create, retrieve, update, delete functions or any other database operations (e.g., SELECT statements or the like).

At 420, it is detected that the table has been replaced with a view. The view can be specified via a database view identifier. For example, the table object consulted by the execution engine can include an indication that the table has been replaced as described herein. A reference to the view object, view identifier, or the like can be stored by the table object. In practice, the indication can be the view identifier (e.g., a null identifier indicates no replacement).

To achieve execution of the operation, the application execution engine can translate the operation into a form suitable for execution by the database management system. At 430, when translating the request to perform the operation, the view identifier is substituted for the table identifier in the operation. In this way, the database table is replaced with the database view transparently to the application.

At 440, the operation is performed on the view instead of the table. The operation is thus performed responsive to the request from the application. The translated request can be submitted to a database management system, which performs the operation. In practice, the database management system can provide enhanced services that can involve submission of instructions to an SQL engine, calculation engine, SQL script, or combinations thereof.

As described herein, a mapping can be stored in memory to achieve replacement. For example, objects representing the table and view can be stored.

Example 12—Example Table-View Mapping

Figure 5:
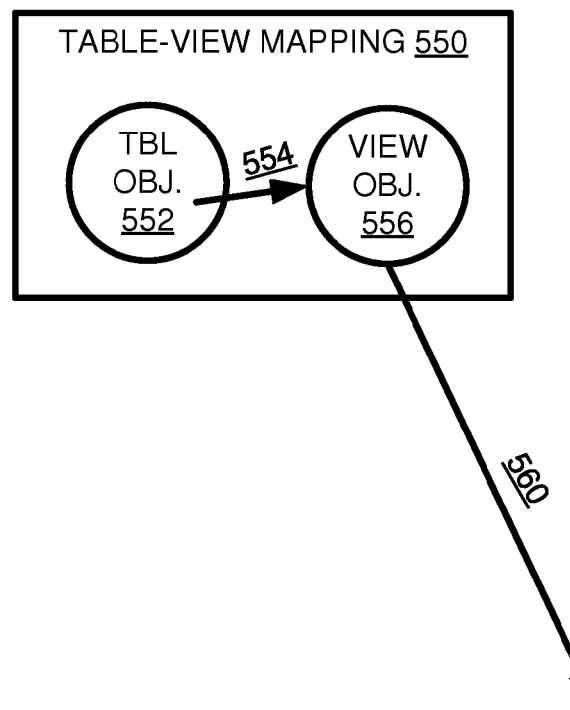
FIG. 5 is a block diagram of an example table-view mapping using a table object and a view object.

FIG. 5 is a block diagram of an example system 500 implementing a table-view mapping 550 that can be used in any of the examples herein (e.g., the mapping 155).

In the example, a table object 552 is stored in memory and represents the database table that is being replaced. The table object 552 can include a reference 554 to a view object 556 that represents the database view that is replacing the table. The view object 556 can include a reference 560 to the database view that replaces the table.

Such objects 552, 556 can be stored and examined by the application execution engine at runtime to achieve operations performed on tables, views, and the like.

Example 13—Example Table Object

Figure 6:
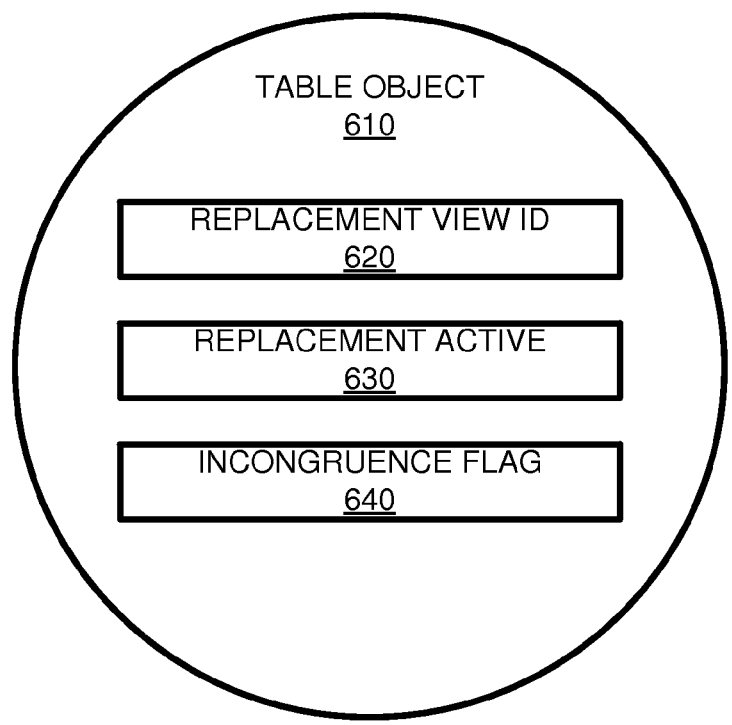
FIG. 6 is a block diagram of an example table object.

FIG. 6 is a block diagram of an example table object 610 that can be used in any of the examples herein (e.g., the table object 552) to represent a table being replaced as described herein. Such an object 610 can be stored to represent the database table at runtime.

In the example, the table object 610 is stored in memory and represents the database table that is being replaced. The object 610 can be consulted at runtime to detect whether the represented table is replaced by a view. A view object can be similarly stored in memory at runtime and can include a reference to the database view.

The object 610 comprises a replacement view identifier 620 (e.g., an identifier of the view or an object representing the view), an indication of replacement 630 (e.g., whether a replacement is active), and an incongruence flag 640 (e.g., indicating whether the table and the view are congruent as described herein).

The replacement view identifier 620 can serve as a reference to a view object for the database view.

The indication of replacement 630 can serve as a replacement indication that the database table is replaced by the database view. Detecting that a replacement view has been specified for the database table can comprise evaluating the stored replacement indication in the table object.

At runtime, the reference to the view object (e.g., in the table object) can be followed, and the database view identifier can be retrieved from the view object.

The table and view objects can be built based on the data dictionary. For example, responsive to encountering a REPLACE directive in the data dictionary, the replacement indication can be stored in the table object.

The incongruence flag 640 can indicate incongruence between the database table and the database view as described herein. After detecting that the database replacement view has been specified, it can be detected via the incongruence flag incongruence flag 640 that no incongruence exists between the table and the view. Otherwise, an error condition can be raised.

In a system such as that shown in FIG. 1, a table object and a view object can be used as the mapping. The application execution engine can be configured to, responsive to receiving an operation from the application specifying the database table identifier, detect that the table object representing the database table specified by the database table identifier indicates that the view object is to be used in place of the table. Then, responsive to so detecting, the reference to the database view specified by the view object can be substituted in place of the database table for the operation.

Where the system includes an SQL engine operable to perform SQL operations on the database, the application execution engine can forward the operation to the SQL engine after substituting the reference to the database view in place of the database table identifier.

Example 14—Example Method of Validation after Modification

FIG. 7 is a flowchart of an example method 700 implementing table-view congruence validation after a view has been modified and can be implemented, for example, in the system shown in FIG. 1, 5, or 6. When a table or view is first created, validation can take place. Subsequent modifications can result in performance of the method 700.

At 710, a modification of the view is detected. For example, modifications to a data dictionary describing the database table and the database view can be monitored. Modifications to any view that is designated as replacing a table can be monitored. Such modifications can include adding a field, rearranging the order of fields, or the like. Modification typically involves deactivation of the modified table or view.

Likewise, changes to the table can be detected.

At 720, responsive to detection of modifications of the view, table-view congruence is validated (e.g., congruence between the database table and the database view is revalidated). Validation can be performed as described herein. If incongruence is detected, an error condition can be raised.

However, because the view can be useful independent of the table, it can still be activated with warnings if the table layout differs. Still, the runtime object for the table can be flagged to indicate that a replacement view is active but the table and view differ (e.g., incongruence flag as described herein).

At 730, responsive to a determination that validation succeeded, the table can be activated.

Example 15—Example Database Management System

In any of the examples herein, a database management system can take the form of a system that provides database management services. In practice, such a system is typically provided as a server providing services to a plurality of requesting clients.

Such a system can include an SQL engine that implements execution of SQL queries and other SQL operations.

Example 16—Example Enhanced Database Service

In any of the examples herein, an enhanced database service can be provided as part of a database management system that provides functionality beyond that offered by a typical SQL engine (e.g., beyond that provided by a lower layer of the database). For example, various functionality, optimizations, annotations, and the like can be offered by such a service. Different join types, arithmetic expressions, function expressions, and case expressions in a selectlist can be supported in view by the service. Such enhanced services can push down more functionality from the application layer into the database layer, even if the database layer is based on open systems. As a result, data transport between layers can be greatly reduced, and complex views allow the databases to account for and optimize data retrieval. Strong candidates for such technology include aggregation tables that pre-aggregate data from other tables.

To access the features of such a service, an application can create a view that is then presented by the enhanced database service. As described herein, a view mirroring a table can be created to take advantage of optimizations offered by such a service. The view can then be substituted in place of the table transparently as described herein. In this way, the application can take advantage of the enhanced database service, and re-coding of the application need not be done.

Such an enhanced service can offer a variety of domain-specific languages that can serve as a common core model for stacks on top of the service. Such languages can include a data definition language (DDL) for defining semantically rich domain data models which can be further enriched through annotations. A data dictionary can incorporate such a DDL.

The enhanced service can support a query language (QL) for conveniently and efficiently reading data based on data models as well as for defining views within a data model.

The service can also support an expression language (EL) for specifying calculated fields, default values, constraints, or the like within queries as well as for elements in data models.

In addition to the domain-specific languages, the enhanced database service can include advanced techniques for writing data, handling transactions, access control, and the like. Services can be provided independent of a particular programming language or language paradigm.

Example 17—Example Table-View Congruence Validation

In any of the examples herein, validating congruence between a table and a view can take the form of determining whether the table and view have the same number of columns, the same column names, in the same order, with the same types (e.g., data type, length, decimals, and the like). As described herein, the results of congruence validation can be stored and consulted at runtime. Failure of congruence can lead to an error condition. The table can thus remain in a new or revised state (e.g., not be activated).

Upon validation, the table can be placed in an active state and the replacement information can be made available in the table's runtime object. The runtime object can thus realize communication between the data dictionary and the application execution engine.

In practice, congruence may allow slight variability between the table and view. For example, includes and control field information need not be taken into account.

A complete match as described can be used to guarantee compatibility.

Example 18—Example Implementation

In one implementation, the enhanced database service can take the form of the Core Data Services provided by SAP SE. The application can be an ABAP program and executed by an SAP Application Server under control of a runtime system. However, the technologies can be equally applied in other computing environments.

Example 19—Example Execution

In one implementation, the process proceeds as follows: reading a data dictionary comprising a database table description describing a database table and a database view description describing a database view, wherein the data dictionary specifies that the database view is to replace the database table; confirming that the database table description and the database view description indicate congruent description for the database table and the database view, wherein the confirming comprises performing a congruence check; based on the database view description, creating a view object stored in memory comprising a reference to the database view; based on the database table description, creating a table object stored in memory indicating that the database table is replaced by the database view, wherein the table object comprises a reference to the view object; at runtime, when receiving a request to perform an operation on the database table, detecting that the table object indicates that the database table is to be replaced by the database view, verifying that the table object indicates that the congruence check was successful, substituting the database view for the database table, and performing the operation on the database view instead of the database table.

As described herein, replacement can be done to replace a classic view with an enhanced view (e.g., instead of replacing a table with a view).

Example 20—Example Advantages

The technologies described herein can provide access to enhanced database services without the need to re-code or manually replace a table with a view. In practice, large, enterprise-class software cannot be modified without expending considerable resources on the modification. Other activities such as testing and quality control also come into play when modifying such large software systems.

SELECT statements on tables can be preserved in applications without changing the code, but the table is still replaced with an enhanced view whenever the SELECT statement is executed on the table.

Similarly, attempting to manually replace a table with a view can lead to problems during the transition period. For example, extra or temporary tables need to be maintained to avoid loss or inconsistency of data.

Accordingly, it can be of great benefit to be able to replace a table transparently to the application as described herein. The resources to re-code the application can be avoided, and loss and inconsistency of data can be avoided.

Example 21—Example Computing Systems

Figure 8:
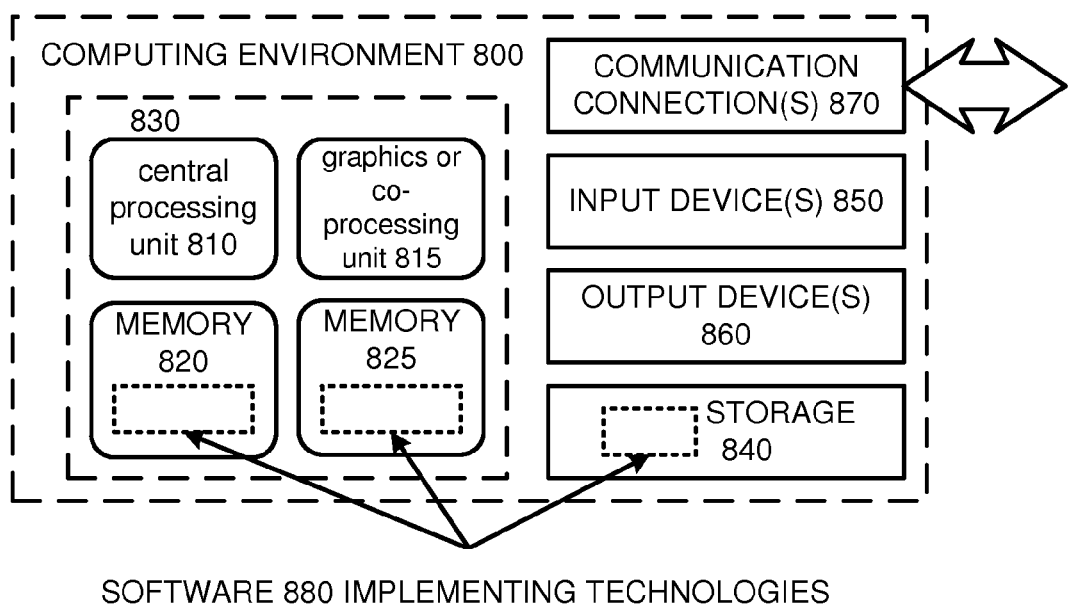
FIG. 8 is a diagram of an example computing system in which described embodiments can be implemented.

FIG. 8 illustrates a generalized example of a suitable computing system 800 in which several of the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 22—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method of controlling database operations at runtime of an application, the method comprising:
   storing a table object representing a database table, wherein the table object comprises a stored indication that the database table should be replaced by a database view in at least a portion of database operations, a reference to a view object for the database view, and an incongruence flag indicating incongruence between the database table and the database view, wherein the database table has a database table identifier and the database view has a database view identifier;
   storing the view object, wherein the view object comprises the database view identifier for the database view;

at runtime of an application, receiving a request from the application to perform an operation on the database table, the requested database operation comprising the database table identifier for the database table;

detecting that the database view has been specified to replace the database table in at least a portion of received database operation requests, wherein detecting comprises evaluating the stored indication in the table object;

detecting that no incongruence exists between the database table and the database view via the incongruence flag;

translating the requested database operation, wherein translating the requested database operation comprises, responsive to the detections, substituting the database view identifier for the database table identifier in the requested database operation;

performing the requested database operation as translated; and returning results of the requested database operation to the application as if the operation was performed on the database table when instead it was performed on the database view, thereby replacing the database table with the database view transparently to the application.

2. The method of claim 1, wherein performing the requested database operation comprises:
submitting the translated requested database operation to a database management system.

3. The method of claim 2, wherein the database management system provides enhanced services comprising a submission to at least one of: an SQL engine, a calculation engine, or an SQL script.

4. The method of claim 1, wherein the method further comprises:
at runtime, determining whether the requested database operation comprises a specified type of statement;
wherein the substituting is performed responsive to determining that the requested database operation does comprise the specified type of statement.

5. The method of claim 4, wherein the specified type of statement is a SELECT statement.

6. The method of claim 1, wherein:
the database view is provided by an enhanced database service providing view functionality beyond that of an SQL engine.

7. The method of claim 6, wherein the view functionality comprises one or more domain-specific languages.

8. The method of claim 1, further comprising:
following the reference to the view object; and
retrieving the database view identifier from the view object.

9. The method of claim 1, further comprising:
responsive to encountering a REPLACE directive in a data dictionary, storing the indication in the table object.

10. The method of claim 1, further comprising:
detecting a modification of a data dictionary describing the database table and the database view; and
responsive to detecting the modification, validating congruence between the database table and the database view.

11. The method of claim 1, further comprising:
responsive to detecting incongruence between the database table and the database view, raising an error condition.

12. The method of claim 10, further comprising:
responsive to detecting incongruence between the database table and the database view, setting the incongruence flag to allow for substitution and providing a warning of the incongruence.

13. The method of claim 1, wherein the incongruence flag indicates congruence when at least one control field of the database table and at least one control field of the database view are different.

14. The method of claim 1, wherein the database view mirrors the database table.

15. One or more computer-readable media comprising computer-executable instructions causing a computing system to perform a method comprising:
reading a data dictionary comprising a classic database view description describing a classic database view and an enhanced database view description describing an enhanced database view, wherein the data dictionary specifies that the enhanced database view is to replace the classic database view;

confirming that the classic database view description and the enhanced database view description indicate congruent description for the classic database view and the enhanced database view, wherein the confirming comprises performing a congruence check;

based on the enhanced database view description, creating an enhanced view object stored in memory comprising a reference to the enhanced database view;

based on the classic database view description, creating a classic view object stored in memory indicating that the classic database view is replaced by the enhanced database view, wherein the classic view object comprises a reference to the enhanced view object; and at runtime, when receiving a request to perform an operation on the classic database view, detecting that the classic view object indicates that the classic database view is to be replaced by the enhanced database view, verifying that the classic view object indicates that the congruence check was successful, substituting the enhanced database view for the classic database view, and performing the operation on the enhanced database view instead of the classic database view.

16. One or more computer-readable media comprising computer-executable instructions that, when executed, cause a computing system to perform a method of controlling database operations at runtime of an application, the method comprising:
in memory, storing a table object representing a database table, wherein the table object comprises a stored indication that the database table should be replaced by a database view in at least a portion of database operations, a reference to a view object for the database view, and an incongruence flag indicating incongruence between the database table and the database view, wherein the database table has a database table identifier and the database view has a database view identifier;

in memory, storing the view object, wherein the view object comprises the database view identifier for the database view;

at runtime of an application, receiving a request from the application to perform an operation on the database table, the requested database operation comprising the database table identifier for the database table;

detecting that the database view has been specified to replace the database table, wherein detecting comprises evaluating the stored indication in the table object;

detecting that no incongruence exists between the database table and the database view via the incongruence flag;

translating the requested database operation, wherein translating the requested database operation comprises, responsive to the detections, substituting the database view identifier for the database table identifier in the requested database operation;

performing the requested database operation as translated; and returning results of the requested database operation to the application as if the operation was performed on the database table when instead it was performed on the database view, thereby replacing the database table with the database view transparently to the application.

17. The one or more computer-readable media of claim 16, wherein translating the requested database operation further comprises:

responsive to detecting that the database view has been specified to replace the database table, retrieving the view object reference from the table object, following the view object reference to the view object, and retrieving the database view identifier from the view object for use in the substitution.

18. The one or more computer-readable media of claim 16, wherein the method further comprises:

at runtime, determining whether the requested database operation comprises a specified type of statement;

wherein the substituting is performed responsive to determining that the requested database operation does comprise the specified type of statement.

19. The one or more computer-readable media of claim 16, further comprising:

detecting a modification of a data dictionary describing the database table and the database view; and responsive to detecting the modification, validating congruence between the database table and the database view.

20. The one or more computer-readable media of claim 16, wherein performing the requested database operation comprises:

submitting the translated requested database operation to a database management system.

* * * * *